July 26, 1932.  W. E. PLANK  1,868,912
STEERING MECHANISM STABILIZER
Filed March 16, 1931  3 Sheets-Sheet 1
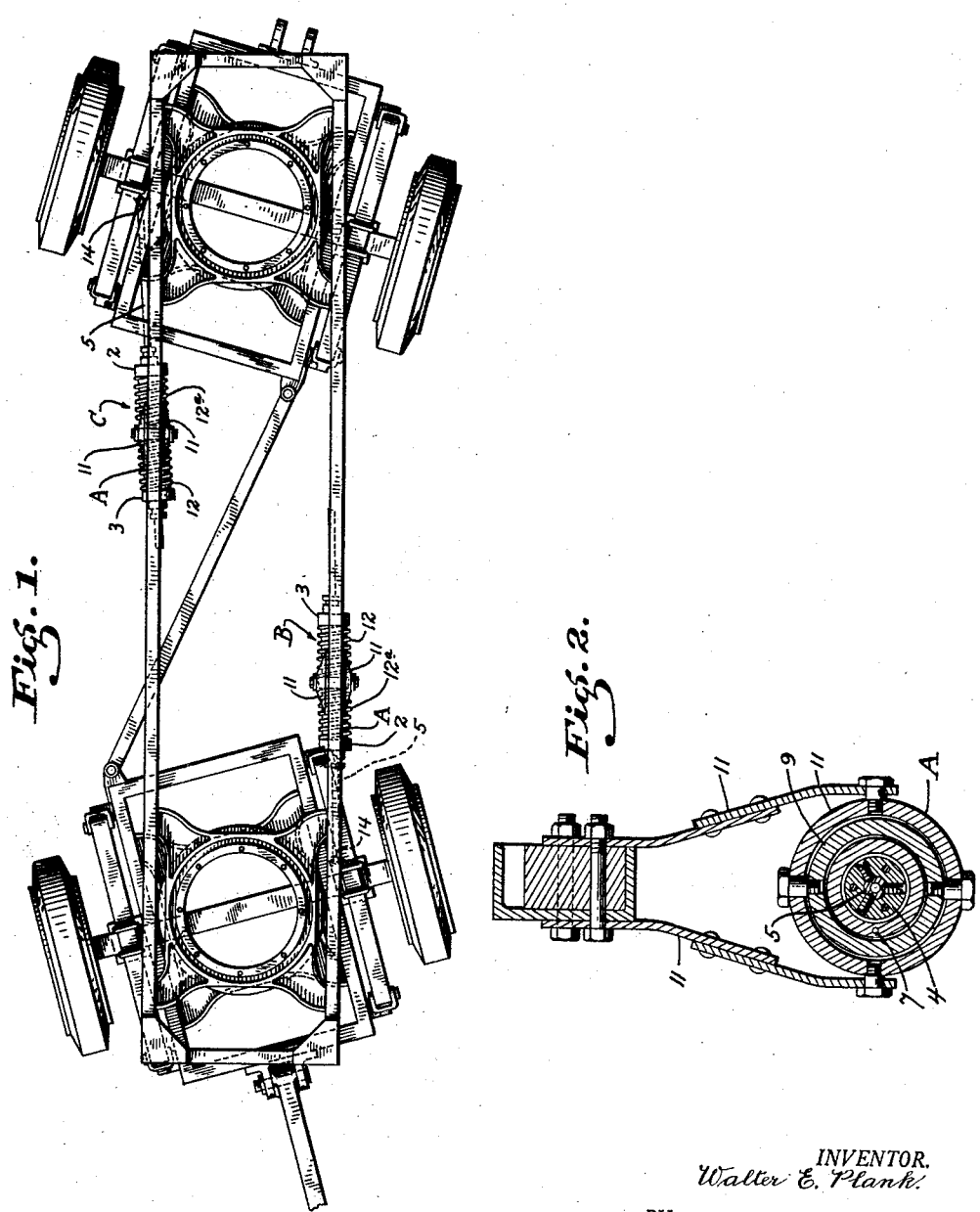
INVENTOR.
Walter E. Plank.
BY Townsend, Loftus & Abbett
ATTORNEYS.

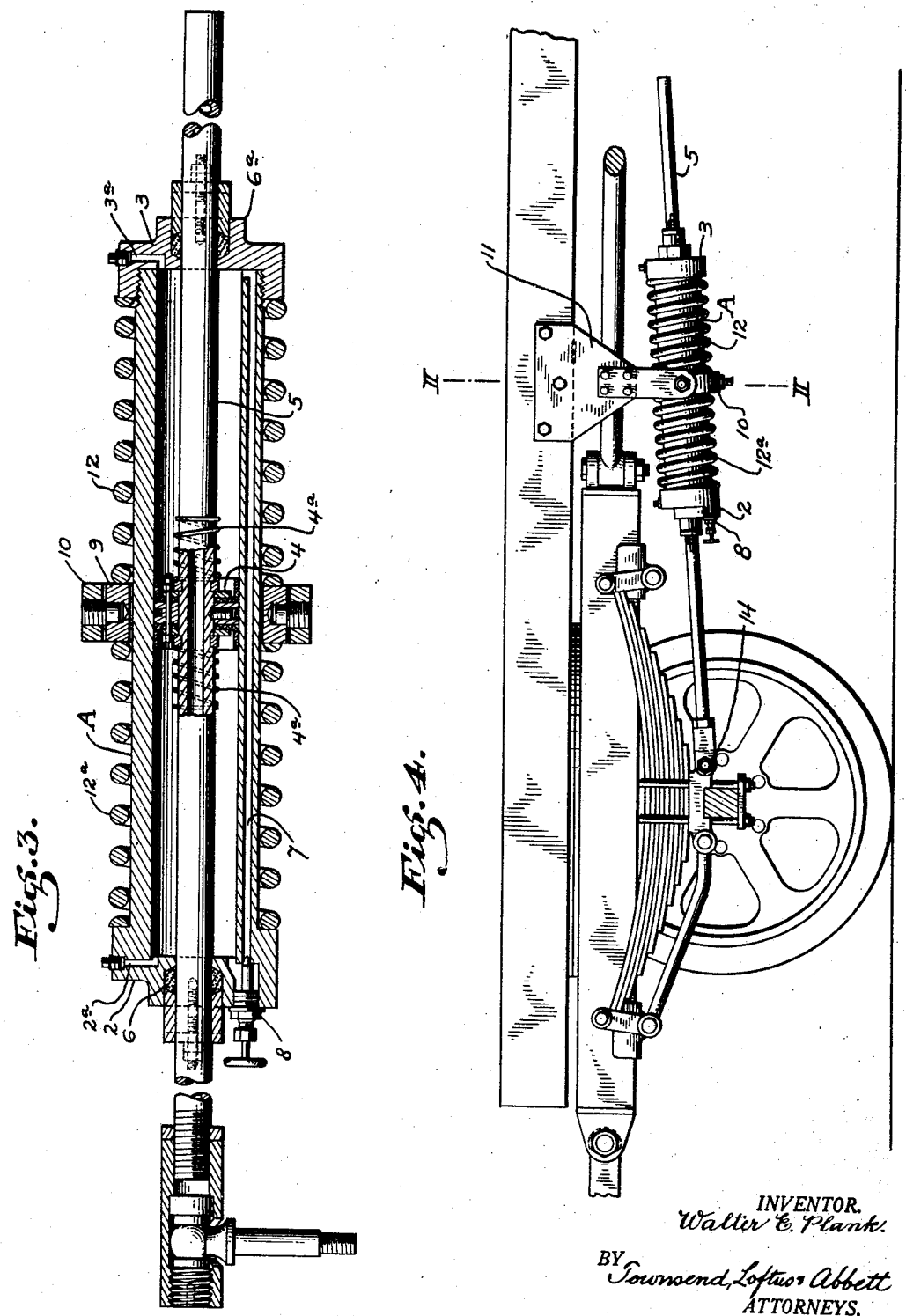

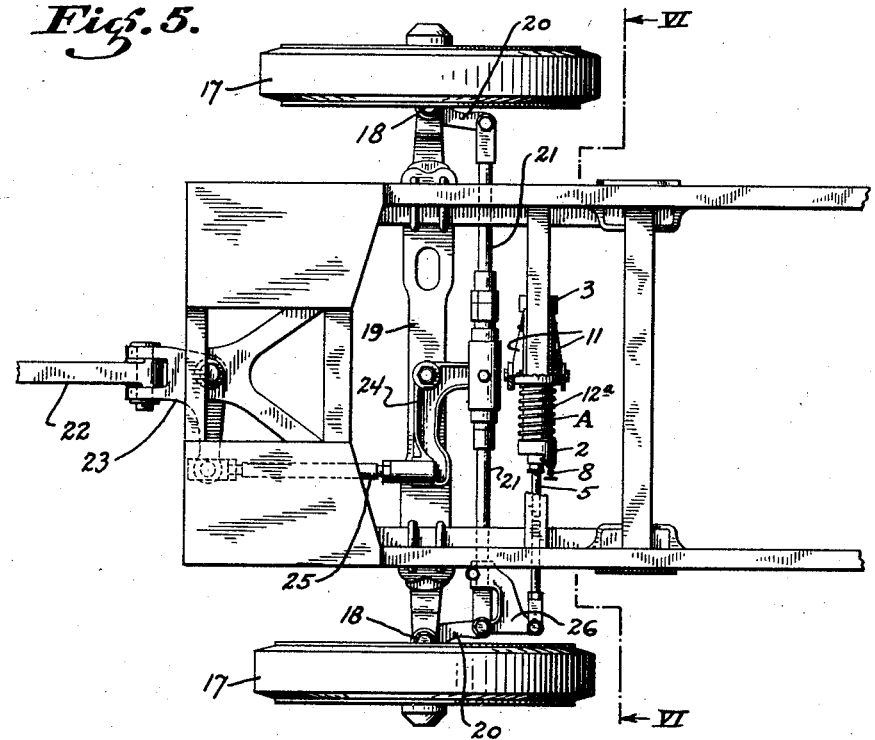
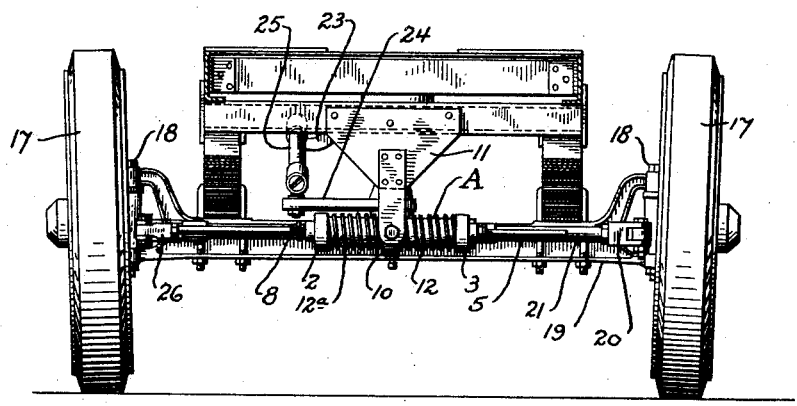

Patented July 26, 1932

1,868,912

UNITED STATES PATENT OFFICE

WALTER E. PLANK, OF SAN FRANCISCO, CALIFORNIA

STEERING MECHANISM STABILIZER

Application filed March 16, 1931. Serial No. 522,942.

This invention relates to a steering mechanism such as employed in trailers and the like and especially to a stabilizer attachment whereby whip, side-lash, weaving, etc., is eliminated.

Where trailers are being hauled over highways by means of trucks which travel at a comparatively high speed passing vehicle traffic is subjected to considerable danger as the trailers have a tendency to whip and weave due to lost motion in the draw-bar and steering mechanism. Where a single trailer is being hauled the danger is not so great but where several trailers are being hauled in train formation the danger is very great.

Two types of steering mechanism are usually employed, to-wit, the fifth wheel type and the steering knuckle type. Both types are subject to a certain amount of lost motion which gradually increases as wear takes place. Furthermore weaving and whipping increases the wear and strain on the mechanism and the life of the mechanism is accordingly reduced and parts of the mechanism are subject to breakage.

The object of the present invention is to provide a stabilizer which may be readily attached to trailers regardless of the type of steering mechanism employed; to provide a stabilizer which will take up or absorb the play or lost motion in the steering mechanism and thereby reduce wear and chances of breakage to a minimum; to provide a stabilizer in which shocks and strains are cushioned and absorbed both by spring and fluid pressure resistance; to provide means whereby the stabilizer can be readily attached to the main frame and the steering mechanism of the trailer, whether it be the fifth wheel or steering knuckle type; and, further, to provide a method of attachment whereby full floating and universal movement of the stabilizer with relation to the frame is permitted.

The stabilizer is shown by way of illustration in the accompanying drawings, in which—

Fig. 1 is a plan view of a heavy duty double-end trailer of the fifth wheel type showing the manner in which the stabilizers are attached to the fifth wheels.

Fig. 2 is an enlarged cross section taken on line II—II of Fig. 4.

Fig. 3 is a longitudinal section of the stabilizer.

Fig. 4 is an enlarged side elevation of the front end of a fifth wheel trailer showing the manner of connecting the stabilizers with relation to the fifth wheel, said view also showing the manner in which the stabilizer is supported by the main frame.

Fig. 5 is a plan view of the front end of a steering knuckle type of trailer showing the manner in which the stabilizer is attached thereto.

Fig. 6 is a vertical cross section taken on line VI—VI of Fig. 5.

Referring to the drawings in detail and particularly Figs. 2 and 3, A indicates a cylinder, the opposite ends of which are closed by head members such as indicated at 2 and 3. Mounted within the cylinder is a double-ended piston 4 and secured to the piston in any suitable manner is a piston rod 5. Stuffing boxes 6 and 6a are formed on the cylinder heads and the piston rod extends therethrough, one end of the steering rod being secured to the steering mechanism of the trailer as will hereinafter be described.

Formed in the cylinder is a longitudinally extending passage 7 whereby the opposite ends of the cylinder are connected. An adjustable valve 8 is mounted at one end of the passage so as to regulate the flow of the fluid through the passage 7. The piston rod 5 moves in unison with the steering mechanism of the trailer and as such transmits a reciprocal movement to the piston 4 and as the cylinder is filled with oil or a like fluid it is esesntial that the oil be transferred from one end of the cylinder to the other as the piston reciprocates. The valve controls this transfer of oil and as such may impose more or less resistance to the movement of the piston, the resistance imposed being such that the piston and steering mechanism can move comparatively freely and without any substantial resistance during normal steering operations. On the other hand, if a quick movement is transmitted to the piston and rod as when striking a bump, or, for instance caused by whipping or weaving, the resistance becomes sufficient to check or cushion such movement.

Fluid pressure is not altogether depended upon to resist whip or weaving action of the trailer. Figs. 3 and 4 clearly show that springs are also depended upon to check such movement. This is accomplished as follows: By referring to Figs. 2 and 3, it will be noted that the piston is centrally supported by a ring 9 and that this ring forms the inner ring of a gimbal mounting, the outer ring of which is shown at 10; the gimbal rings being in turn pivotally mounted in bracket arms 11 which extend downwardly from the frame. No connection is made between the inner ring 9 and the cylinder and the cylinder is accordingly longitudinally movable in the ring. Springs such as shown at 12 and 12a are, however, interposed between the inner ring 9 and the opposite head members 2 and 3 of the cylinder. These springs are fairly rigid and as such normally retain the cylinder against endwise movement but when the cylinder and piston is subjected to sudden shocks part of the shock is cushioned by the fluid medium employed and part by the spring resistance. The spring is accordingly not only universally supported by means of the gimbal rings so as to permit to spring freely but it is also longitudinally movable with relation to the universal mounting.

In Figs. 1 and 4 the stabilizer is shown as attached to a trailer of the fifth wheel type. The stabilizer proper, or in other words, the cylinder A is supported with relation to the frame by means of the bracket arms 11. The piston rod on the other hand is attached to one of the movable parts of the fifth wheel, for instance, to the axle as indicated at 14 in Fig. 4, hence when the fifth wheel and axle swings during normal steering operations the cylinder remains stationary within the gimbal rings and the piston 4 moves freely but the moment a sudden shock or load is imposed both may move, that is, the piston will move within the cylinder and the cylinder in turn will move within the gimbal rings hence utilizing fluid pressure and spring compression to assist and absorb shocks.

Where a double-ended trailer is employed as shown in Fig. 1, two stabilizers may be employed, one indicated at B and the other indicated at C. These are both attached to the frame in the manner shown in Fig. 2 and their piston rods are attached to the axle as shown in Fig. 4, hence movement of either fifth wheel is cushioned and whipping or weaving is substantially eliminated.

In Figs. 5 and 6 the stabilizers are shown as attached to a trailer employing a knuckle type of steering mechanism. The front or steering wheels 17 are in this instance pivotally mounted as at 18 in the fork formed at the outer ends of the axle 19. The pin and spindle of each wheel is provided with a steering arm 20 and these are connected by a tie rod 21 in the usual manner, said tie rod being in turn actuated from the draw-bar 22 through means of a pair of pivotally mounted bell cranks 23 and 24 through an intermediate link 25, hence as the draw-bar swings movement is transmitted to the tie rod 21 to swing the wheels 17 to one side or another. In this instance it is only necessary to apply an auxiliary bracket to the tie rod at the point indicated at 26. This is connected with a piston rod 5 of the stabilizer and the stabilizer is in turn disposed crosswise of the frame as shown in Figs. 5 and 6 and it is there universally supported in the same manner as that illustrated in Fig. 2.

From the foregoing description it will be noted that the stabilizer is equally applicable whether a fifth wheel or steering knuckle type of trailer is employed. The stabilizers can be readily attached to the frame of either type and it is just as readily attached to the steering mechanism.

By referring to Fig. 3, it will be noted that the heads 2 and 3 are provided with vertical ducts 2a and 3a normally closed by screw plugs. These may be removed from time to time to replenish the oil supply in the cylinder which is lost by leakage through the stuffing boxes. It will also be noted that the piston 4 is provided with a pair of bumper springs such as shown at 4a. These will seldom be used as they only come into action when the piston approaches one end of the cylinder or the other, for instance, when making sharp turns or the like and as such function to protect the cup leather on the pistons against damage. The valve 8 is placed in an exposed position where it is readily accessible and as such may be quickly adjusted to increase or decrease the fluid pressure resistance imposed upon the piston. For instance, if a train of trailers is being hauled at a comparatively slow speed the resistance may be decreased by slightly opening the valves. On the other hand, if the trailers are to travel at a high speed the valve can be closed and so on.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. The combination with the steering wheels and the main frame of a trailer, of a cylinder, a universal support connecting the cylinder to the frame of the trailer, said cylinder being longitudinally movable in the universal support, spring means resisting longitudinal movement of the cylinder, a fluid resisted piston in the cylinder, and means connecting the piston with the steering wheels.

2. The combination with a steering mechanism and the main frame of a trailer, of a cylinder, a piston in the cylinder, a piston rod connecting the piston with the steering mechanism, a fluid in the cylinder and resisting movement of the piston and connected steering mechanism, means supporting the cylinder with relation to the main frame, said means permitting longitudinal movement of the cylinder with relation to the frame, and means normally resisting longitudinal movement of the cylinder.

3. The combination with a steering mechanism and the main frame of a trailer, of a cylinder, a piston in the cylinder, a piston rod connecting the piston with the steering mechanism, said cylinder being substantially filled with a liquid, means whereby the liquid is transferred from one side of the piston to the other during movement of the steering mechanism and the piston, said transfer of liquid resisting movement of the piston, a support for the cylinder and permitting longitudinal movement thereof, and spring means normally resisting longitudinal movement of the cylinder.

4. The combination with a steering mechanism and the main frame of a trailer, of a cylinder, a piston in the cylinder, a piston rod connecting the piston with the steering mechanism, said cylinder being substantially filled with a liquid, means whereby the liquid is transferred from one side of the piston to the other during movement of the steering mechanism and the piston, said transfer of liquid resisting movement of the piston, valve actuated means for increasing or decreasing the volume or flow of liquid from one side of the piston to the other, a support for the cylinder and permitting longitudinal movement thereof, and spring means normally resisting longitudinal movement.

5. The combination with a steering mechanism and the main frame of a trailer, of a cylinder, a piston in the cylinder, a piston rod connecting the piston with the steering mechanism, a fluid in the cylinder and resisting movement of the piston and connected steering mechanism, a gimbal ring supporting the cylinder with relation to the frame, said gimbal ring permitting longitudinal movement of the cylinder in the ring, and springs interposed between the gimbal ring and opposite ends of the cylinder and normally resisting longitudinal movement of the cylinder.

6. A stabilizer of the character described comprising a cylinder, a head member on each end of the cylinder, a piston rod extending through the cylinder and the head members, a piston secured to the rod within the cylinder, a universal support for the cylinder in which the cylinder is longitudinally slidable, a spring interposed between each end of the cylinder and the universal support, said cylinder being substantialy filled with oil, and means whereby oil may be transferred from one end of the cylinder to the other during movement of the piston.

7. A stabilizer of the character described comprising a cylinder, a head member on each end of the cylinder, a piston rod extending through the cylinder and the head members, a piston secured to the rod within the cylinder, a universal support for the cylinder in which the cylinder is longitudinally slidable, a spring interposed between each end of the cylinder and the universal support, said cylinder being substantially filled with oil, means whereby oil may be transferred from one end of the cylinder to the other during movement of the piston, and a valve whereby the transfer of oil is regulated.

WALTER E. PLANK.